Patented May 13, 1930

1,758,465

UNITED STATES PATENT OFFICE

WILLIAM C. READ OF SCARSDALE, NEW YORK, ASSIGNOR TO ELECTRO METALLURGICAL COMPANY, A CORPORATION OF WEST VIRGINIA

SILICO-THERMIC METALLURGY

No Drawing.   Application filed November 21, 1928. Serial No. 321,036.

The invention is a method of producing metals and alloys from metal-containing compounds by silico-thermic reduction.

In the silico-thermic process it is usual to augment the heat liberated in the main reaction by heat liberated in an auxiliary, strongly exothermic reaction, thereby promoting or accelerating the main reaction. This is conveniently brought about by adding to the charge an excess of silicon over the quantity required to reduce the ore or the like, and providing an energetic oxidizing agent to react with the excess silicon. Nitrates, such as the sodium and calcium salts, are especially cheap and effective oxidizing agents for this purpose. I have discovered, however, that certain metals and alloys, particularly those containing chromium, tend to absorb detrimental quantities of nitrogen when produced by a silico-thermic reduction accelerated or promoted with a nitrate.

The present invention provides a method of operation in which the cheap nitrates can be used as promoters without unduly contaminating the reduced metal with nitrogen.

It has been customary heretofore to ignite silico-thermic charges at the top. I have discovered that ignition at the bottom of the charge is decidedly to be preferred, and that this method of ignition unexpectedly results in a much lower absorption of nitrogen by the reduced metal when a nitrate promoter is used. Also, when the charge is ignited from below, less heat is lost by radiation, due to the fact that the exposed surface of the charge does not reach its maximum temperature until the reaction is almost complete, whereas with top ignition, the exposed surface is immediately brought to a high temperature and radiates strongly throughout the reaction. Diminishing the heat losses results in a more vigorous and more complete reaction.

Except as herein indicated, I follow generally the practice heretofore used in preparing metals and alloys by self-propagating reaction. I prefer to grind all ingredients of the charge until at least 90% will pass a 100 mesh sieve, and in some cases still finer grinding is advantageous. For the best results the materials should be dry and thoroughly mixed. The mixture may be briquetted to keep down dusting losses. The reaction may be carried out in any suitable receptacle or furnace, for example, in a simple steel shell lined with refractory material. The charge may be ignited by a hot wire or any of the ignition devices used in the art. Additional exothermicity may be provided for in the bottom of the charge, where ignition is to occur, in order to cause the reaction to get under way more quickly.

The invention may also be practiced by charging the self-propagating silico-thermic mixture into a refractory-lined furnace containing a small bath of molten slag or metal which serves to initiate the reaction. The mixture may be all charged at one time, or it may be charged gradually and continuously at a rate equal to or greater than the rate of propagation of the reaction. From the standpoint of heat conservation it is desirable to charge at a rate somewhat in excess of the rate of propagation for the purpose of maintaining a blanket of mixture over the molten products, thus minimizing radiation losses from the top of the furnace and at the same time taking advantage of the sensible heat in the liberated gases to preheat the unreacted mixture.

The reducing agent may be silicon metal or an alloy of silicon, such as ferro-silicon. It is sometimes advantageous to employ as reducing agent a silicon alloy of the metal to be reduced from the ore. For example, in the case of the reduction of chromium ore for the manufacture of low carbon ferrochrome, a ferrochrome-silicon alloy may usually be employed to advantage.

In a specific example, a briquetted reaction mixture was charged into a refractory-lined iron pot and ignited at the bottom by means of a primer surrounded by an ignition charge containing 4 parts of dry sodium dichromate and one part of silicon. The main charge contained

| | Pounds |
|---|---|
| Chromium ore | 2,290 |
| Ferrochrome-silicon | 1,075 |
| Sodium nitrate | 640 |
| Lime | 45 |

The ferrochrome-silicon contained approximately 50% of silicon. The charge reacted rapidly and yielded fluid products. The recovered ferrochrome analyzed:

| % Cr | % Si | % C | % N |
|---|---|---|---|
| 65.40 | 2.83 | 0.04 | 0.20 |

In a similar experiment in which the charge was ignited at the top, the alloy analyzed:

| % Cr | % Si | % C | % N |
|---|---|---|---|
| 64.00 | 1.11 | 0.10 | 1.26 |

It will be noted that the nitrogen content of the product resulting from upward propagation is only about 16% as much as in the case of the product from downward propagation.

I claim:

1. The method of preparing metals and alloys by self-propagating silico-thermic reduction which comprises the step of igniting from below a charge comprising a metal oxide, a silicious reducing agent, and a nitrate promoter.

2. The method of preparing metals and alloys by self-propagating silico-thermic reduction which comprises the step of igniting from below a charge comprising chromic oxide, a silicious reducing agent and a nitrate promoter.

In testimony whereof, I affix my signature.

WILLIAM C. READ.